United States Patent [19]

Wheeler

[11] 4,052,735
[45] Oct. 4, 1977

[54] MODULATED FLESHTONE AND TINT CORRECTION CIRCUITRY

[75] Inventor: Robert Charles Wheeler, Elba, N.Y.

[73] Assignee: GTE Sylvania Incorporated, Stamford, Conn.

[21] Appl. No.: 584,939

[22] Filed: June 9, 1975

[51] Int. Cl.² .......................................... H04N 9/535
[52] U.S. Cl. .......................................................... 358/28
[58] Field of Search .......................................... 358/28

[56] References Cited

U.S. PATENT DOCUMENTS

| | | | |
|---|---|---|---|
| 3,663,744 | 5/1972 | Harwood | 358/28 |
| 3,668,306 | 6/1972 | Hansen et al. | 358/28 |
| 3,882,534 | 5/1975 | Srivastava | 358/28 |
| 3,916,438 | 10/1975 | Portoulas | 358/28 |
| 3,950,781 | 4/1976 | Miyamoto | 358/28 |

Primary Examiner—John C. Martin
Attorney, Agent, or Firm—Norman J. O'Malley; Theodore D. Lindgren; Robert T. Orner

[57] ABSTRACT

A fleshtone and tint correction detector DC coupled to at least two of the first, second, and third demodulator stages of a color television receiver provides a control signal in response to a shift in differential potential output from the demodulator stages to effect a shift in phase angle of reference signals applied in the demodulators whereby fleshtone and other color errors are reduced with a minimum deleterious effect on other colors.

16 Claims, 3 Drawing Figures

MODULATED FLESHTONE AND TINT CORRECTION CIRCUITRY

CROSS REFERENCE TO OTHER APPLICATIONS

A U.S. application Ser. No. 381,251 entitled "Gated Automatic Tint Control Circuit" was filed on July 20, 1973, now U.S. Pat. No. 3,882,534 in the name of Gopal Krishna Srivastava and assigned to the Assignee of the present application. Therein a switching means AC coupled to a demodulator circuit effects alteration of the phase angle of the reference oscillator signals to provide fleshtone correction in accordance with signals of a selected polarity from a demodulator stage. Moreover, regulated bias circuitry and noise defeating circuitry are included in the apparatus.

BACKGROUND OF THE INVENTION

Generally, fleshtone correction circuitry for selectively modifying the hue of a color television receiver is expected and provided in modern-day television receivers. As a matter of fact, fleshtone correction circuitry which is automatic rather than manually operated is the generally accepted standard.

More specifically, fleshtone or hue compensating apparatus utilizing both active and passive components has been employed in color television receivers. In either case the chrominance or reference oscillator signals applied to demouulator stages are altered in phase to automatically reduce variations of color signals along the fleshtone and cyan axes of a standard chrominance diagram and effect enhancement of fleshtone reproduction by the receiver.

However, it has been found that such fleshtone enhancement is frequently and unfortunately accompanied by undesirable alteration of colors in other areas of the standard chrominance diagram. For example, colors which should appear green, such as grass, often undesirably appear blue or yellow when fleshtone enhancement is employed.

One known attempt to alleviate the above-mentioned undesired alteration of colors, other than fleshtones, by hue compensation circuitry is disclosed in the cross-referenced application entitled "Gated Automatic Tint Control Circuit". Therein, phase alterations of the color reference signals to effect fleshtone enhancement are utilized only during a specific gated portion of the chrominance diagram. Specifically, the gated period or altered phase angles occur only for colors in the first and second quadrants of the standard chrominance diagram. Thus, fleshtones are enhanced by altering phase angles but colors in the other quadrants, such as green and blue for example, are unaffected by the enhancement circuitry.

More specifically, it has been found that an activated fleshtone correction system, such as a system gated or turned on by a positive R-Y signal in the first and second quadrants of the standard chrominance vector diagram for example, tends to require readjustment of the tint controls. In other words, activation of the fleshtone correction circuitry alters the fleshtone reception whereupon manual tint control adjustment is required. However, altering the tint control also alters all colors including fleshtones whereupon the colors excluded from the gated fleshtone correction system, blue and green for example, are undesirably altered. Thus, green grass will tend to appear yellow or blue skies will tend to be green.

Although the above-mentioned "Gated Automatic Tint Control Circuit" has provided numerous advantages and enhanced reception in color television receivers, it has been found that there are areas which still leave something to be desired. Also, a reduction in cost and complexity of the circuitry is obviously desirable. Moreover, an improved response without adverse effect on cost is also an obviously desirable condition.

OBJECTS AND SUMMARY OF THE INVENTION

An object of the present invention is to provide circuitry for enhancing the hue of a color television receiver. Another object of the invention is to enhance the fleshtone and tint correction of a television receiver with relatively simple and inexpensive circuitry. Still another object of the invention is to improve the sensitivity and capabilities of fleshtone and tint correction circuitry in a color television receiver. A further object of the invention is to provide gated fleshtone and tint correction enhancement circuitry suitable for energization in the first and portions of the second and fourth quadrants of a standard chrominance vector diagram.

These and other and further objects, advantages and capabilities thereof are achieved in one aspect of the invention by a fleshtone and tint correction circuit wherein a fleshtone and tint correction detector coupled to at least two of the first, second, and third color demodulator stages provides a control signal in response to a shift in the potential differential derived from the demodulators to effect alteration in the phase angle of reference signals applied to the color demodulator stages whereby fleshtones and other colors are enhancement without deleterious effects.

PREFERRED EMBODIMENT OF THE INVENTION

For a better understanding of the present invention, together with other and further objects, advantages and capabilities thereof, reference is made to the following disclosure in conjunction with the accompanying drawings.

Figure 1:
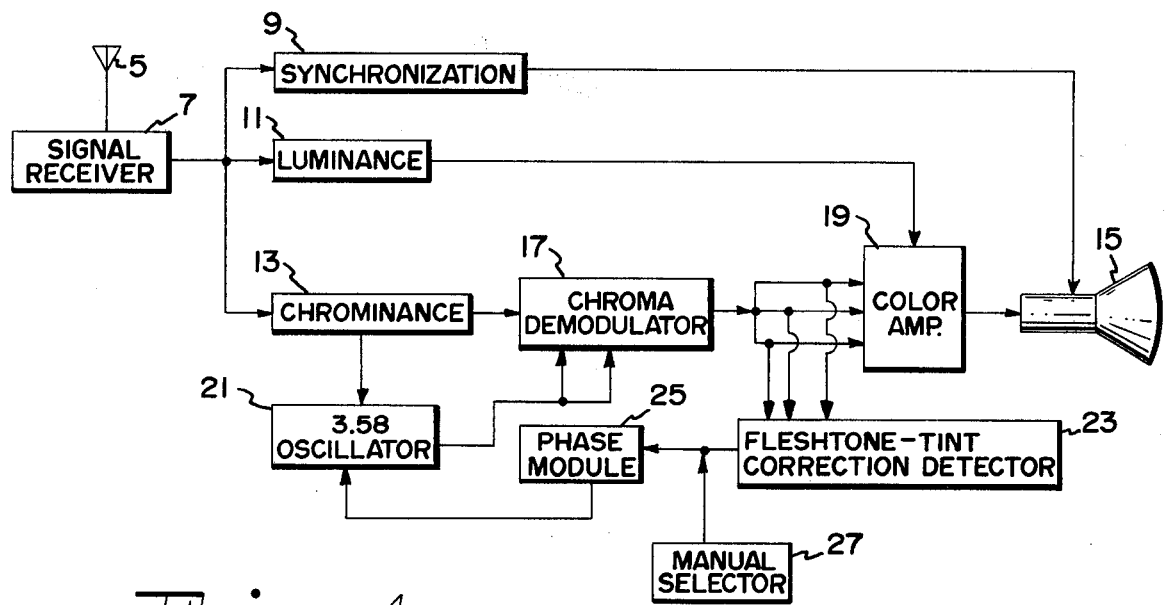
FIG. 1 is an illustration, in block form, of a color television receiver employing a preferred embodiment of the invention.

Referring to the drawings, FIG. 1 illustrates a color television receiver having an antenna 5 coupled to a signal receiver 7 which includes the usual RF and IF amplifier stages, oscillator and mixer stages. The signal receiver 7 provides an output signal which is applied to a synchronization and deflection channel 9, a luminance channel 11, and a chrominance channel 13. The synchronization and deflection channel 9 is coupled to a color cathode ray tube 15 in the usual manner while the luminance channel 11 is coupled to color amplifier stages 19.

The chrominance channel 13 is coupled to chroma demodulator stages 17 which provide the usual color difference signals, R-Y, B-Y, and G-Y for application to the color amplifier stages 19. The color amplifier stages 19 are, in turn, coupled to the color cathode ray tube 15.

Also, the chrominance channel 13 provides a color burst signal which is applied to and controls the operation of a reference oscillator signal source or 3.58 mHz oscillator stage 21.

A fleshtone and tint correction detector means 23 is coupled to the output of the chroma demodulator stages 17 and provides a control signal for a phase angle modulator means 25. The phase angle modulator means 25, in response to control signals from the fleshtone and tint correction detector means 23, has the capability of modifying the phase angle of the reference signals derived from the reference oscillator signal source 21 and applied to the chroma demodulator stages 17. Moreover, a manual selector 27 is coupled to the phase angle modulator means 25 and has the capability of defeating the fleshtone and tint correction detector means 23.

Figure 2:
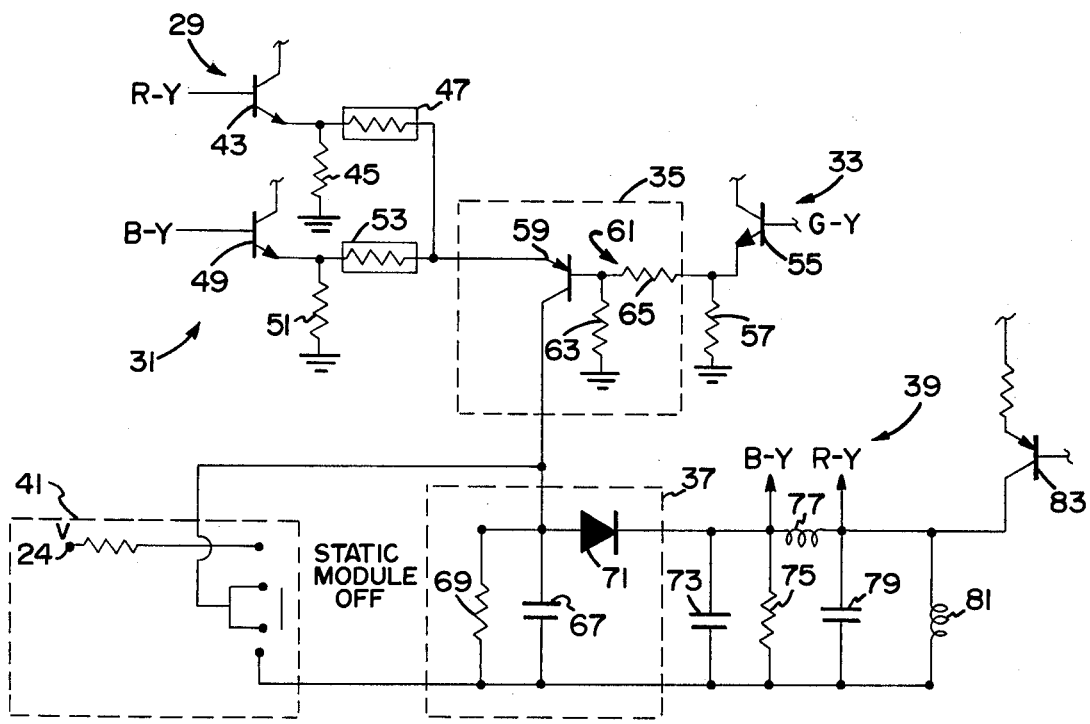
FIG. 2 is an illustration, in block and schematic form, of a preferred embodiment of the invention.

In the more specific illustration of FIG. 2, first, second, and third or R-Y, B-Y, and G-Y demodulator stages 29, 31, and 33 are coupled to the fleshtone and tint correction detector means 35. The fleshtone and tint correction detector means 35 is coupled to the phase angle modulator means 37 which is, in turn, coupled to a 3.58 reference oscillator signal source 39.

The 3.58 reference oscillator signal source 39 provides reference signals for the demodulator stages 29, 31, and 33 and these reference signals are phase angle shifted in accordance with the operation of the phase angle modulator means 37. Also, a manually selective switching means 41 is coupled to and capable of defeating the phase angle modulator means 37. Moreover, a preferred form of manual switching means 41 includes a static condition coupling a potential source V illustrated as a terminal 24, a modulated condition utilizing the described apparatus, and an "off" condition wherein the circuitry is coupled to circuit ground.

Referring back, the first or R-Y demodulator stage 29 is illustrated as a transistor 43 having an output electrode or emitter coupled to circuit ground by a resistor 45 and by a first impedance 47 to the fleshtone and tint correction detector means 35. Similarly, the second or B-Y demodulator stage 31 includes a transistor 49 with an output electrode or emitter coupled to circuit ground by a resistor 51 and by a second impedance 53 to the fleshtone and tint correction detector means 35. Also, the third or G-Y demodulator stage 33 includes a transistor 55 having an output electrode or emitter connected to circuit ground by a resistor 57 and to the fleshtone and tint correction detector means 35.

The fleshtone and tint correction detector means 35 is in the form of a transistor 59 with an emitter electrode connected to the first and second demodulator stages 29 and 31 by way of the first and second impedances 47 and 53 respectively. Also, the base of the transistor 59 is connected by way of a bias network 61, including resistors 63 and 65, to the emitter or output electrode of the third demodulator stage 33. Moreover, the collector of the transistor 59 is DC coupled to the phase angle modulating means 37.

The phase angle modulating means 37 includes a phase shift capacitor 67 shunted by a resistor 69 and coupled to the fleshtone and tint correction detector means 35. A diode 71 couples the phase shift capacitor 67 to the reference oscillator signal source 39.

The reference oscillator signal source or 3.58 mHz oscillator 39 includes shunt connected capacitor 73 and resistor 75 connected to the diode 71, to the second or B-Y demodulator stage 31 and to an inductor 77. The inductor 77 is coupled to the first or R-Y demodulator stage 29, a parallel connected capacitor 79 and inductor 81 and to a transistor 83.

Figure 3:
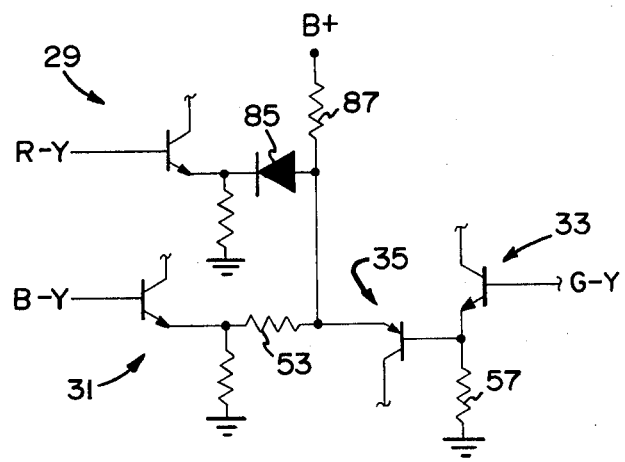
FIG. 3 is an alternate embodiment of the invention.

In an alternate embodiment of FIG. 3 wherein similar numbers refer to corresponding components of FIG. 2, a resistor, 47 of FIG. 2 for example, may be replaced by a diode 85 coupled to the emitter of the transistor 43 and resistor 45. Also, the bias network, 61 of FIG. 2, may be replaced by a resistor 87 coupled to a potential source B+, to the diode 85, and to the emitter of the transistor 59.

As to operation, the transistor 59 of the fleshtone and tint correction detector means 35 is biased toward conduction by the bias network 61 even for a substantially zero demodulated color input signal. In other words, the transistor 59 tends to operate in what might be described as "partial class A" operation where no signal input is present. Thus, the transistor 59 is switched "full on" and "full off" by low color level signals whereby switching color distortion is inhibited. Moreover, the bias network 61 may obviously be replaced by other systems for providing the same bias conditions i.e. a resistor coupling the emitter of the transistor 59 to a potential source.

Also, the emitter of the transistor 59 is coupled to at least one of the demodulator stages, R-Y demodulator 29 for example, while the base of the transistor 59 is coupled to another of the demodulator stages, G-Y demodulator stage 33. Thus, as the potential differential applied to the emitter and base of the transistor 59 from the R-Y and G-Y demodulator stages 29 and 33 shifts due to variations in the outputs of the R-Y and G-Y demodulators, the conductivity of the transistor 59 will shift. As a result, a control signal, representative of R-Y and G-Y potential differential appears at the collector of the transistor 59.

This control signal is applied to and alters the conductivity of the diode 71 of the phase angle modulating means 37. When the diode 71 becomes conductive, the parallel connected phase shift capacitor 67 and resistor 69 are shunted across the parallel connected capacitor 73 and resistor 75. Thereupon the reference oscillator signals appearing at the R-Y and B-Y signal terminals are altered or modulated in phase in accordance with the shift in output from the R-Y and G-Y demodulators 29 and 33.

Thus, the above-mentioned combination of the first or R-Y demodulator stage 29 coupled to the emitter and the G-Y or third demodulator stage 33 coupled to the base of the transistor 59 would provide a "gated" tint type operation. For example, an increase in the red signal as compared with the green signal would tend to "turn on" the transistor 59 while a negative or $-(R-Y)$ signal would tend to turn off the transistor 59. Also, a positive green or G-Y signal would tend to turn off the transistor 59 while a negative or $-(G-Y)$ signal would tend to turn on the transistor 59.

In summary, the fleshtone detector means 35 is biased slightly conductive in order to minimize problems of threshold conductivity wherein a low color level fleshtone signal would not activate the system and provide the enhanced fleshtone condition. Also, the DC potentials appearing at the output of the R-Y and G-Y demodulator stages 29 and 33 are substantially equal under a no signal condition. This eliminates the need for separate adjustable bias or AC coupling with DC restoration and noise protection.

As the output from the R-Y demodulator stage 29 increases in a positive polarity direction or the G-Y demodulator 31 advances in a negative polarity direction, a normal fleshtone correction condition, conductivity of the transistor 59 increases. In turn, conductivity of the diode 71 occurs and the capacitor 67 is shunted across the capacitor 73 to effect an increase in the phase angle difference between the reference oscillator signals to a value of about 130°, for example. Thus, dynamic variation of the phase angle of the chroma signals applied to the demodulators 29 and 31 serve to shift the relative phase angle of the reference oscillator signals.

Similarly, when the output of the R-Y demodulator stage 29 is advanced in a negative direction with respect to the output from the G-Y demodulator stage 33 or the G-Y demodulator stage 33 advances positively with respect to the R-Y demodulator stage 29, depicting a green or cyan color condition, the collector current from the transistor 49 decreases. Thereupon, the diode 71 becomes non-conductive which decouples the capacitor 67 from the 3.58 oscillator means 39. As a result, the phase angle difference between the reference oscillator signals returns to a normal operational condition of about 90° for example.

Additionally, the preferred embodiment of FIG. 2 illustrates a matrix network which includes the R-Y demodulators 29 coupled by a first impedance 47 and the B-Y demodulator 31 coupled by a second impedance 53 to the emitter of the transistor 59. The G-Y demodulator stage 33 is coupled to the base of the transistor 59.

As can be readily understood, signals from the R-Y and B-Y demodulators 29 and 31 can be matrixed by selected values for the first and second impedances 47 and 53. In this manner, the control signal from the fleshtone and tint correction detector means 35 is selected such that phase modulation of the reference oscillator signal source 39 is effected for signals in the first and in portions of the second and fourth quadrants of a standard chrominance vector diagram. Thus, fleshtone as well as cyan or green and blue color reproduction is enhanced.

Further, it is well known that utilization of a fleshtone correction system for correctly transmitted signals tends to cause "orangy" and unnatural appearing yellow and fleshtone colors. Thus, the above-mentioned first and second impedances 47 and 53 are selected to provide a correction of the signal only when the fleshtones would tend to become purple in color. In that portion of the second quadrant where yellows and fleshtones are transmitted correctly, the correction circuitry is rendered inoperative.

In other words, the correction circuitry is operative in that portion of the second quadrant of the standard chrominance vector diagram intermediate a vector representative of normal fleshtones and a vector representative of R-Y signals. Also, the correction circuit is active in the first quadrant and in that portion of the fourth quadrant approaching cyan or intermediate vectors representative of B-Y and cyan signals. Thus, some degree of correction is provided for cyan skies which would tend to appear green when the transmitted signals include a phase error which tends to shift fleshtones toward purple.

In the alternate embodiment of FIG. 3, a diode 85 is substituted for the resistor 47 of FIG. 2. Thus, the matrix system is defeated and correction is no longer provided in portions of the second and fourth quadrants of the standard chrominance diagram. Rather, phase modulation is effected only in the first quadrant when the outputs of both the R-Y and B-Y demodulators, 29 and 31, are of a positive polarity.

It should also be noted that a specific demodulator stage is not a requirement of the circuitry. In other words, the system is especially suitable to the utilization of a matrix network for deriving one of the color difference signals from the other two color difference signals i.e. G-Y signals from R-Y and B-Y signals for example.

Additionally, the manually selective switching means 41 permits an operator or viewer to manually disable the automatic dynamic modulated fleshtone correction circuit. In other words, an operator can manually short circuit the phase angle modulator means 37, selectively couple a fixed potential source to the 3.58 oscillator means 39, or couple the modulated correction circuit.

Thus, a dynamic modulated fleshtone correction circuit has been provided. The circuit automatically enhances fleshtone reproduction capabilities of a color signal receiver without deleterious effects on the rendition of other colors by the receiver. The system utilizes a potential differential of the demodulator stages and their stable and accurate DC output conditions to provide improved response and capabilities with a reduction in cost and complexity of circuitry. Moreover, it is obvious that various combinations of color and color difference signals may be utilized in a manner to provide a special or desired combination of color enhancement and normal color reception.

While there has been shown and described what is at present considered the preferred embodiment of the invention, it will be obvious to those skilled in the art that various changes and modifications may be made therein without departing from the invention as defined by the appended claims.

What is claimed is:

1. A fleshtone and tint correction circuit for a color television receiver having chrominance and reference oscillator signal sources comprising:
    first, second, and third color demodulator stages coupled to said chrominance and reference oscillator signal sources;
    phase angle modulator means coupled to said reference oscillator signal source for altering the phase angle of signals applied to at least two of said first, second, and third color demodulator stages; and
    fleshtone and tint correction detector means DC coupled to said first, second, and third color demodulator stages and to said phase angle modulator means, said detector means responding to the output from said demodulator stages to provide a control signal for altering the phase angle between at least two of said reference oscillator signals applied to said demodulator stages.

2. The fleshtone and tint correction circuit of claim 1 wherein said phase angle modulator means includes a phase shift means and a uni-directional conduction device with said uni-directional conduction device responsive to a control signal from said fleshtone and tint correction circuit for selectively coupling said phase shift means to said reference oscillator signal source to vary the phase angle between at least two of the signals applied to said demodulator stages.

3. The fleshtone and tint correction circuit means of claim 1 wherein said fleshtone and tint correction detector means includes an electron device DC coupled to said phase angle modulator means and to said first, second, and third color demodulator stages.

4. The fleshtone and tint correction circuit of claim 1 wherein said fleshtone and tint detector means includes a transistor having first and second electrodes DC coupled to said first, second, and third demodulator stages and a third electrode DC coupled to said phase angle modulator means.

5. The fleshtone and tint correction circuit of claim 1 including a manual switching means connected to said phase angle modulator means for selective engagement to cause said phase angle modulator means to selectively provide a static phase angle modulated signal, a dynamic phase angle modulated signal, and an unmodulated phase angle signal.

6. The fleshtone and tint correction circuit of claim 1 including a manual switching means formed for selective engagement to a potential source whereby a static phase angle modulated signal is effected.

7. The fleshtone and tint correction circuit of claim 1 wherein said fleshtone and tint correction detector means includes a bias network for effecting conductivity thereof in the absence of signals from said color demodulator stages.

8. The fleshtone and tint correction circuit of claim 1 wherein said fleshtone and tint correction detector means includes an electron device having a first electrode coupled by first and second impedances to first and second demodulator stages respectively, a second electrode coupled to a third demodulator stage, and a third electrode DC coupled to said phase angle modulator means.

9. The fleshtone and tint correction circuit of claim 8 wherein said first and second impedances are of a ratio to provide a phase angle shift of said phase angle modulator means for color signals in the first quadrant and portions of the second and fourth quadrants of a standard chrominance vector diagram.

10. In a color television receiver having a reference oscillator and chrominance signal sources, a fleshtone and tint correction circuit comprising:
first, second, and third sources of color demodulator signals coupled to said reference oscillator and chrominance signal sources;
fleshtone and tint correction detector circuit means comprising a transistor DC coupled to at least two of said first, second, and third sources of color demodulator signals for effecting development of a control signal in response to a shift in differential output from said sources of demodulator signals; and
phase angle modulator means coupled to said fleshtone and tint correction detector means and to said reference oscillator signal source, said modulator means responsive to said control signal from said fleshtone and tint correction detector means for altering the phase angle between two of the signals applied to said sources of demodulator signals from said reference oscillator signal source.

11. The fleshtone and tint correction circuit of claim 10 wherein said transistor has a first electrode coupled by a first impedance to a first source of color demodulator signals, a second electrode coupled to a second source of color demodulator signals, and a third electrode DC coupled to said phase angle modulator means whereby a shift in the differential signal from said first and second sources of demodulator signals causes a shift in phase angle between reference oscillator signals applied to said sources of demodulator signals.

12. The fleshtone and tint correction circuit of claim 10 wherein said transistor has a first electrode coupled by a uni-directional conduction device to a first source of color demodulator signals, a second electrode coupled to a second source of color demodulator signals, and a third electrode DC coupled to said phase angle modulator means whereby a shift in the differential signals from said first and second sources of demodulator signals causes a shift in phase angle between reference oscillator signals applied to said sources of demodulator signals.

13. The fleshtone and tint correction circuit of claim 10 wherein said transistor has a first electrode coupled to a source of color demodulator signals by an impedance and a second electrode coupled to a bias network means and to a second source of demodulator signals whereby said bias network means renders said transistor conductive in response to signals of arbitrarily small differential applied to said first and second electrodes.

14. In a color television receiver having reference oscillator and chrominance signal sources, a fleshtone and tint correction circuit comprising:
first, second, and third sources of color demodulator signals coupled to said reference oscillator and chrominance signals sources;
fleshtone and tint correction detector means comprising an electron device having a first electrode DC coupled by first and second impedance to first and second sources of demodulator signals and a second electrode DC coupled to a third source of demodulator signals for effecting development of a control signal in response to a shift in differential output from said sources of demodulator signals; and
phase angle modulator means coupled to said fleshtone and tint correction detector means and to said reference oscillator signal source to provide, in response to said control signal, alteration of the phase angle between two of the signals applied to said first and second sources of demodulator signals from said reference oscillator signal source when a color signal is in the first or portions of the second and fourth quadrants of a standard chrominance vector diagram.

15. The fleshtone and tint correction circuit of claim 14 wherein said electron device has a first electrode DC coupled by first and second impedances to sources of R-Y and B-Y color demodulator signals and a second electrode DC coupled to a source of G-Y color demodulator signals to provide alteration of the phase angle between reference oscillator signals applied to said sources of R-Y and B-Y color demodulator signals when a color signal is in the first and portions of the second and fourth quadrants of a standard chrominance vector diagram.

16. The fleshtone and tint correction circuit of claim 14 wherein said phase angle modulator means includes a phase shift means selectively coupled to said reference oscillator signal source by a uni-directional conduction device.

* * * * *